United States Patent
Katsumata et al.

(10) Patent No.: US 11,330,130 B2
(45) Date of Patent: May 10, 2022

(54) IMAGE PROCESSING APPARATUS, METHOD, AND STORAGE MEDIUM

(71) Applicants: Motoyuki Katsumata, Kanagawa (JP); Yusuke Hayashi, Tokyo (JP)

(72) Inventors: Motoyuki Katsumata, Kanagawa (JP); Yusuke Hayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/205,113

(22) Filed: Mar. 18, 2021

(65) Prior Publication Data
US 2021/0297548 A1    Sep. 23, 2021

(30) Foreign Application Priority Data

Mar. 23, 2020 (JP) .............................. JP2020-051222
May 28, 2020 (JP) .............................. JP2020-093443

(51) Int. Cl.
    *H04N 1/00*      (2006.01)

(52) U.S. Cl.
    CPC ..... *H04N 1/00949* (2013.01); *H04N 1/00474* (2013.01); *H04N 1/00503* (2013.01); *H04N 2201/0094* (2013.01)

(58) Field of Classification Search
    CPC ........... H04N 1/00949; H04N 1/00474; H04N 1/00503; H04N 2201/0094; G06F 3/1285; G06F 3/1253; G06F 3/1275; G06F 3/1204
    USPC ......................................................... 358/1.13
    See application file for complete search history.

(56) References Cited

U.S. PATENT DOCUMENTS

| | | | |
|---|---|---|---|
| 8,019,853 B2 * | 9/2011 | Machida | H04L 41/22 709/224 |
| 8,237,940 B2 * | 8/2012 | Conescu | G06F 3/1253 358/1.13 |
| 10,079,949 B2 * | 9/2018 | Michimura | G06F 9/451 |
| 2009/0006989 A1 * | 1/2009 | Park | G03G 15/5075 715/762 |
| 2018/0068345 A1 * | 3/2018 | Hirokawa | H04N 1/00941 |
| 2020/0081676 A1 * | 3/2020 | Kayama | G06F 3/1285 |

FOREIGN PATENT DOCUMENTS

| | | |
|---|---|---|
| EP | 3621005 | 3/2020 |
| JP | 2018-046551 | 3/2018 |

OTHER PUBLICATIONS

Extended European Search Report for 21163574.3 dated Aug. 6, 2021.

* cited by examiner

*Primary Examiner* — Neil R McLean
(74) *Attorney, Agent, or Firm* — IPUSA, PLLC

(57) ABSTRACT

An image processing apparatus includes a flow execution unit configured to receive, in response to an instruction from a user to start an application installed in the image processing apparatus, a request to register a flow from the application; store information for identifying functions included in the flow and an execution order of the functions; switchably display setting screens for the respective functions included in the flow in response to a request from the application to execute the flow; and execute the functions identified based on the stored information in the stored execution order based on setting information input on the setting screens for the respective functions.

11 Claims, 14 Drawing Sheets

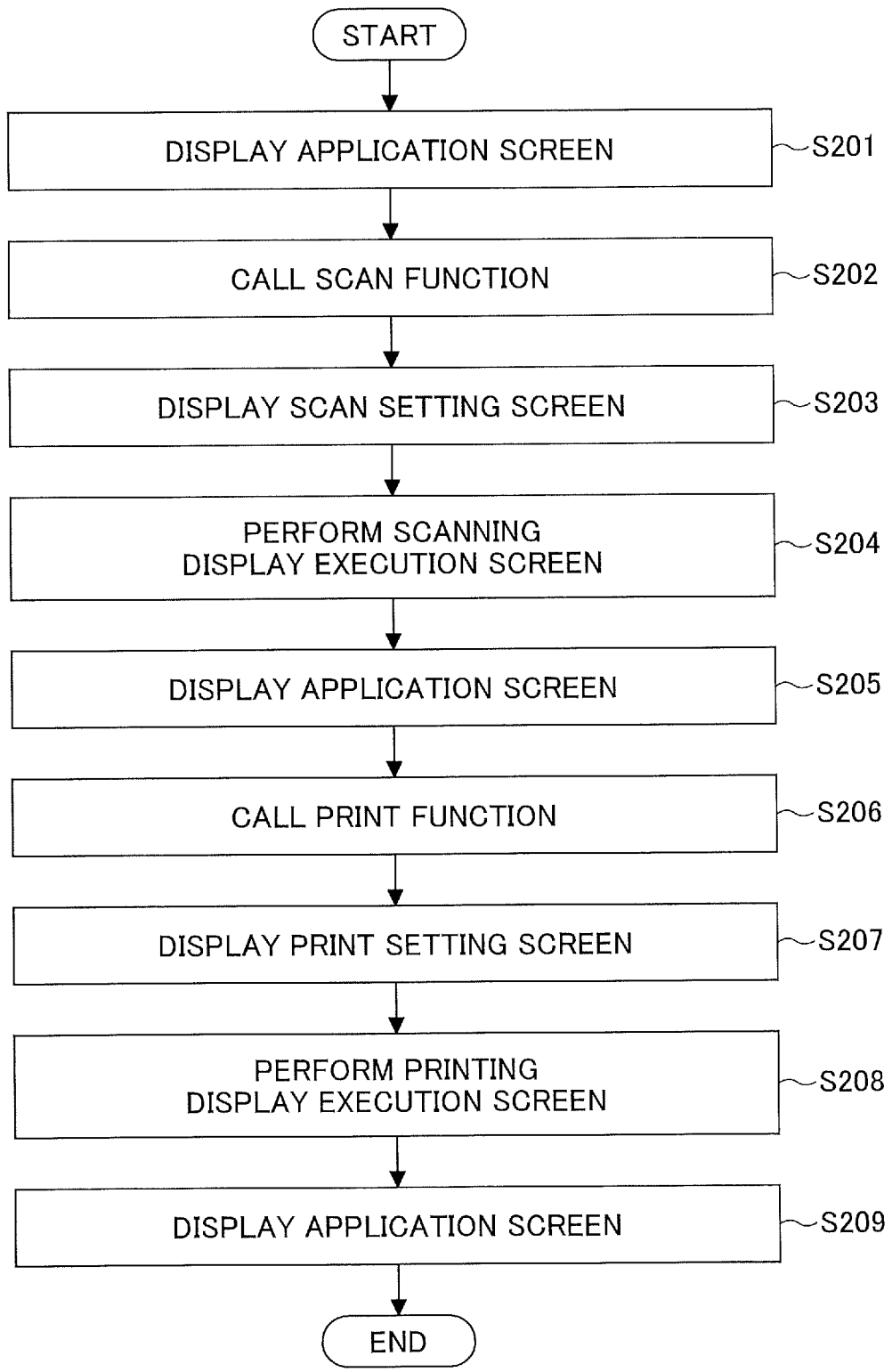

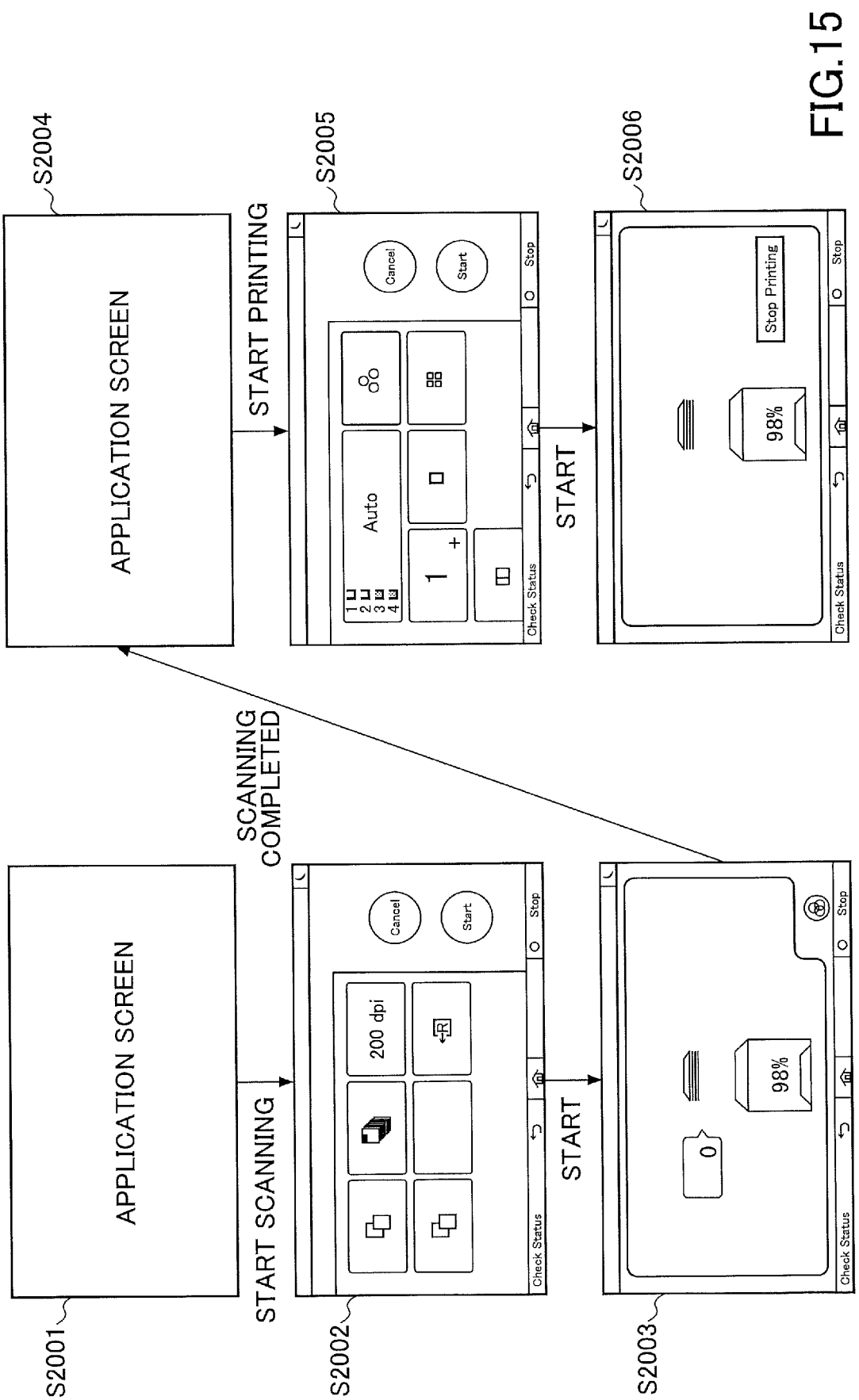

IMAGE PROCESSING APPARATUS, METHOD, AND STORAGE MEDIUM

CROSS-REFERENCE TO RELATED APPLICATIONS

The present application claims priority under 35 U.S.C. § 119 to Japanese Patent Application No. 2020-051222, filed on Mar. 23, 2020 and Japanese Patent Application No. 2020-093443, filed on May 28, 2020. The contents of which are incorporated herein by reference in their entirety.

BACKGROUND OF THE INVENTION

1. Field of the Invention

An aspect of this disclosure relates to an image processing apparatus, a method, and a storage medium.

2. Description of the Related Art

Applications developed by, for example, third-party vendors are installed in an image processing apparatus such as a multifunction peripheral/product/printer (MFP). The applications provide various functions (for example, scan function, print function, etc.) to the image processing apparatus.

Japanese Unexamined Patent Publication No. 2018-046551 discloses a technology related to a software development kit (SDK) that enables, for example, a third-party vendor to easily develop an application that uses functions of an image processing apparatus.

However, when an SDK is designed to provide a user interface (UI) for each function used in an application, the application developed by, for example, a third-party vendor using the SDK needs to display a setting screen for requesting an input each time a function is executed. Accordingly, it is troublesome for the user of the application to input settings and process execution instructions.

SUMMARY OF THE INVENTION

According to an aspect of this disclosure, there is provided an image processing apparatus that includes a flow execution unit configured to receive, in response to an instruction from a user to start an application installed in the image processing apparatus, a request to register a flow from the application; store information for identifying functions included in the flow and an execution order of the functions; switchably display setting screens for the respective functions included in the flow in response to a request from the application to execute the flow; and execute the functions identified based on the stored information in the stored execution order based on setting information input on the setting screens for the respective functions.

BRIEF DESCRIPTION OF THE DRAWINGS

FIG. 14 is a flowchart illustrating a process of executing multiple functions in a related-art image processing apparatus; and FIG. 15 is a drawing illustrating an example of transition of screens displayed on a related-art image processing apparatus.

DESCRIPTION OF THE EMBODIMENTS

An aspect of this disclosure provides an SDK and an application that enable a user to efficiently input information even when the SDK is configured to provide UIs for respective functions used by the application.

Embodiments of the present invention are described below with reference to the accompanying drawings. Throughout the specification and the accompanying drawings, the same reference number is assigned to components having substantially the same function and configuration, and repeated descriptions of those components may be omitted.

<Explanation of Terms>

Applications (which may also be referred to as application programs or application software) installed in an image processing apparatus such as a multifunction peripheral/product/printer (MFP) can provide flows. Here, "flow" indicates a series of processes executed sequentially by multiple functions (i.e., two or more functions). In an embodiment of the present invention, a flow (i.e., a series of processes executed sequentially by multiple functions) can be handled as one job.

For example, functions include functions of an image processing apparatus (inherent functions such as a scan function and a print function that are inherent to the image processing apparatus) and functions other than the functions of an image processing apparatus (functions that are not inherent to the image processing apparatus, for example, a function to add a stamp to an image).

More specifically, for example, functions include input functions (e.g., a scan function to capture an image, and a function to obtain an image from a storage device such as a USB memory, an SD card, or a server), functions to change files (e.g., a function to process an image by applying a stamp, mosaic, or filling to an image, and a function to change a file name), and output functions (e.g., a print function to print an image, a function to store an image in a storage device such as a USB memory, an SD card, or a server, and a function to transfer an image via, for example, email).

For example, a flow may include only functions of an image processing apparatus. As another example, a flow may include both of functions of an image processing apparatus and functions other than the functions of the image processing apparatus. As still another example, a flow may include only functions other than the functions of an image processing apparatus.

<Overall Configuration>

Figure 1:
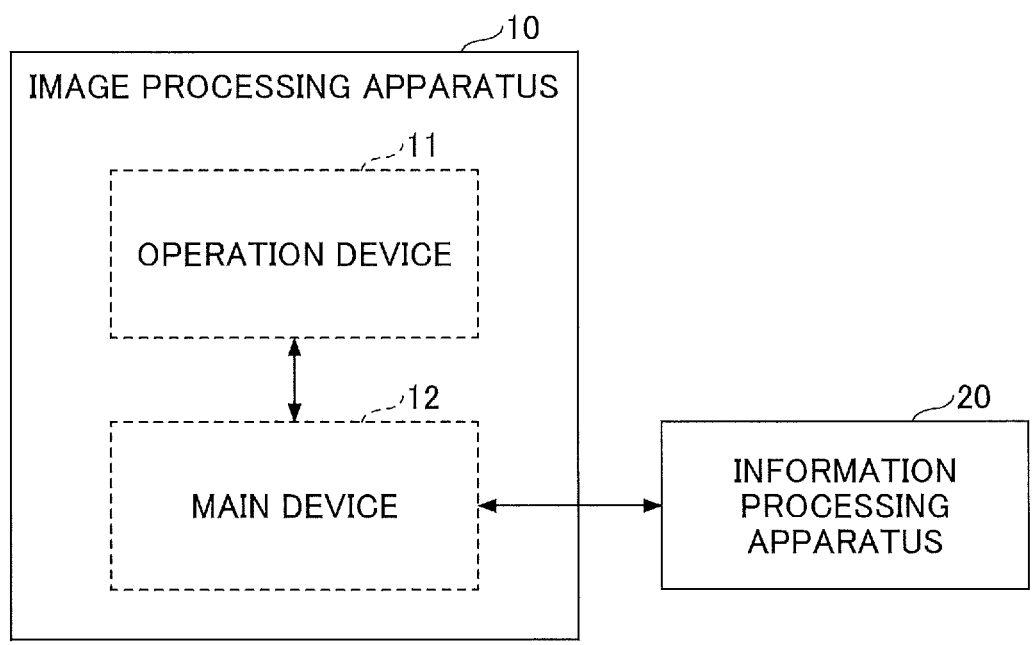
FIG. 1 is a drawing illustrating a configuration of a system according to an embodiment.

FIG. 1 is a drawing illustrating a configuration of a system according to an embodiment. As illustrated in FIG. 1, an image processing apparatus 10, such as a multifunction peripheral, includes an operation device 11 and a main device 12. The image processing apparatus 10 includes at least one function (for example, at least one of a scan function and a print function).

The operation device 11 is used by a user to perform various operations. For example, the operation device 11 is used to select an image processing function to be executed by the main device 12, to input various settings for executing the image processing function, to input an execution instruction to start the execution of the image processing function, and to switch display screens.

The main device 12 executes various processes such as the execution of the image processing function according to various user operations on the operation device 11.

In the example illustrated in FIG. 1, the image processing apparatus 10 includes the operation device 11. However, the present invention is not limited to this example, and an information processing apparatus 20 such as a tablet terminal, a smartphone, a mobile phone, or a personal digital assistant (PDA) may function as an operation device for operating the image processing apparatus 10. That is, the information processing apparatus 20 may be capable of communicating with the main device 12 via a communication I/F 127 of the main device 12 to control the main device 12. In this case, the main device 12 and the information processing apparatus 20 may be collectively referred to as an image processing apparatus.

<Hardware Configuration of Image Processing Apparatus 10>

Figure 2:
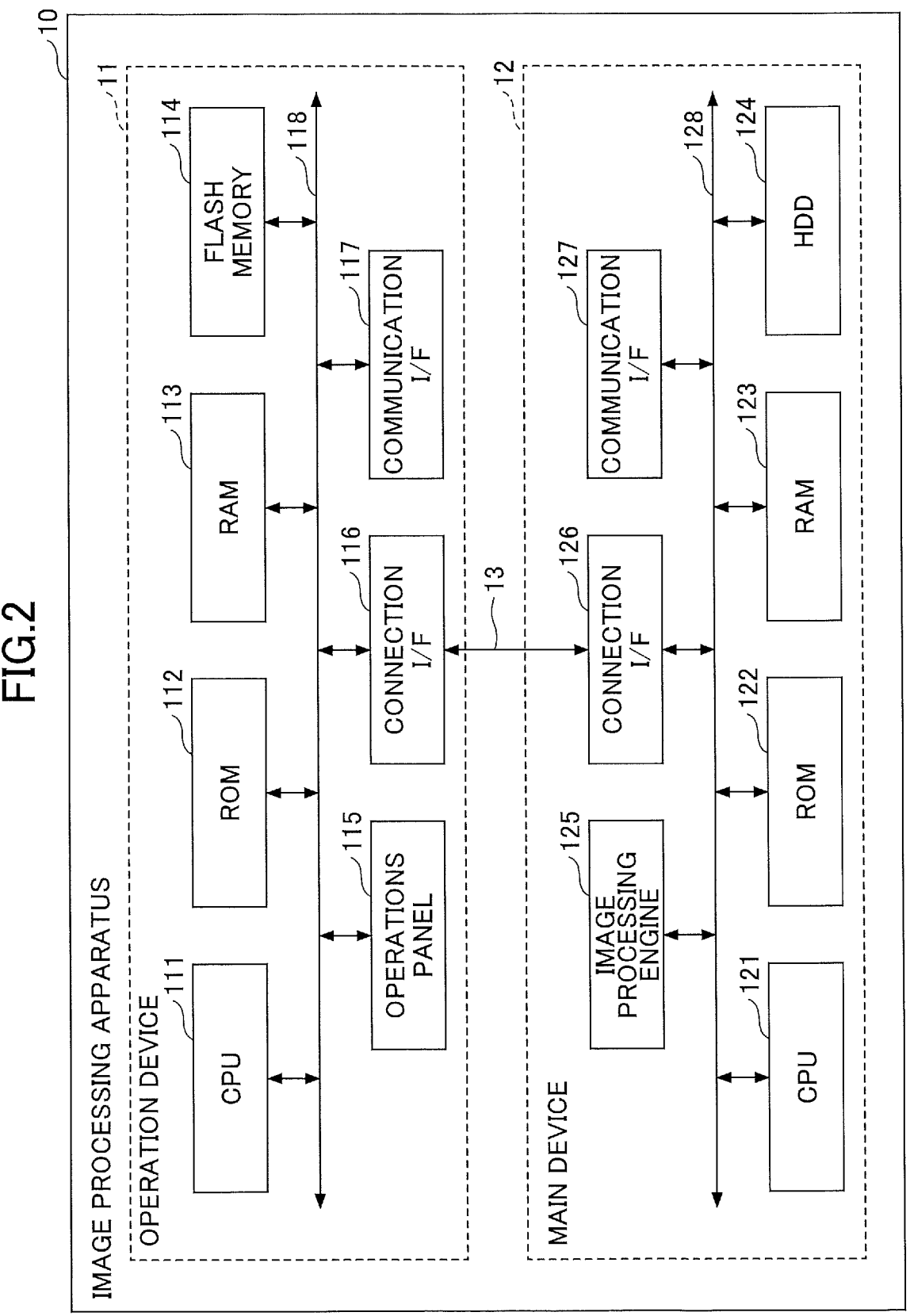
FIG. 2 is a drawing illustrating a hardware configuration of an image processing apparatus according to an embodiment.

FIG. 2 is a drawing illustrating a hardware configuration of the image processing apparatus 10 of the present embodiment. As illustrated in FIG. 2, the image processing apparatus 10 includes the operation device 11 and the main device 12.

As illustrated in FIG. 2, the operation device 11 of the image processing apparatus 10 includes a central processing unit (CPU) 111, a read-only memory (ROM) 112, and a random access memory (RAM) 113. The operation device 11 also includes a flash memory 114, an operations panel 115, a connection interface (I/F) 116, and a communication I/F 117. These hardware components are connected to each other via a bus 118.

The CPU 111 is a processor that controls the entire operation device 11 by executing various programs stored in the ROM 112 or the flash memory 114 using the RAM 113 as a work area.

The ROM 112 is a non-volatile semiconductor memory (storage device) that can retain data even when power is turned off. The RAM 113 is a volatile semiconductor memory (storage device) that temporarily stores programs and data.

The flash memory 114 is a non-volatile storage device that stores various programs (for example, programs for implementing the present embodiment) executed by the CPU 111 and various types of data.

The operations panel 115 is used by the user to perform various operations. In addition, the operations panel 115 displays various screens for the user.

The connection I/F 116 is an interface for communicating with the main device 12 via a communication path 13. The connection I/F 116 is implemented by, for example, a universal serial bus (USB) interface.

The communication I/F 117 is an interface for communicating with other devices. The communication I/F 117 may be implemented by, for example, a wireless local area network (LAN) interface according to a Wi-Fi standard.

Similarly, the main device 12 of the image processing apparatus 10 includes a CPU 121, a ROM 122, and a RAM 123. The main device 12 also includes a hard disk drive (HDD) 124, an image processing engine 125, a connection I/F 126, and a communication I/F 127. These hardware components are connected to each other via a bus 128.

The CPU 121 is a processor that controls the entire main device 12 by executing various programs stored in the ROM 122 or the HDD 124 using the RAM 123 as a work area.

The ROM 122 is a non-volatile semiconductor memory (storage device) that can retain data even when the power is turned off. The RAM 123 is a volatile semiconductor memory (storage device) that temporarily stores programs and data.

The HDD 124 is a non-volatile storage device that stores various programs executed by the CPU 121 (for example, programs for implementing the present embodiment) and various types of data.

The image processing engine 125 is a hardware module that performs image processing to implement various image processing functions such as a print function, a scan function, a copy function, and a fax function.

The image processing engine 125 includes, for example, a plotter that prints an image on a sheet material such as paper, a scanner that optically reads a document and generates image data, and a fax communication device that performs facsimile communications. The image processing engine 125 may also include, for example, a finisher for sorting printed sheet materials, and an automatic document feeder (ADF) for automatically feeding documents.

The connection I/F 126 is an interface for communicating with the operation device 11 via the communication path 13. The connection I/F 126 may be implemented by, for example, a USB standard interface.

The communication I/F 127 is an interface for communicating with other devices. The communication I/F 127 may be implemented by, for example, a wireless LAN interface according to the Wi-Fi standard.

With the hardware configuration illustrated in FIG. 2, the image processing apparatus 10 according to the present embodiment can perform various processes described later.

<Hardware Configuration of Information Processing Apparatus 20>

Figure 3:
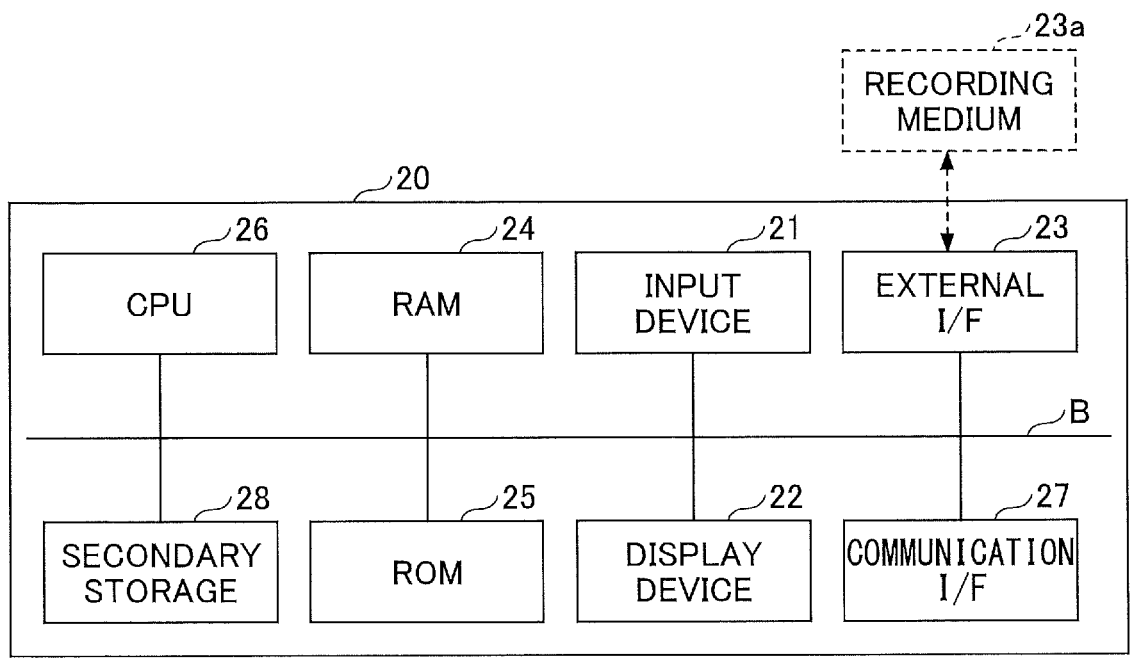
FIG. 3 is a drawing illustrating a hardware configuration of an information processing apparatus according to an embodiment.

FIG. 3 is a drawing illustrating a hardware configuration of the information processing apparatus 20 of the present embodiment. As illustrated in FIG. 3, the information processing apparatus 20 includes an input device 21, a display device 22, an external I/F 23, a RAM 24, a ROM 25, a CPU 26, a communication I/F 27, and a secondary storage 28. These hardware components are connected via a bus B to be able to communicate with each other.

The input device 21 is, for example, a keyboard, a mouse, and/or a touch panel and is used by a user to input various operations. The display device 22 displays, for example, processing results of the information processing apparatus 20.

The external I/F 23 is an interface with an external device. A recoding medium 23a is an example of an external device. The information processing apparatus 20 can read and write information from and to the recoding medium 23a via the external I/F 23.

The recoding medium 23a is, for example, a flexible disk, a compact disc (CD), a digital versatile disk (DVD), a secure digital (SD) memory card, or a universal serial bus (USB) memory card.

The RAM 24 is a volatile semiconductor memory that temporarily stores programs and data. The ROM 25 is a non-volatile semiconductor memory that can retain programs and data even when the power is turned off. The ROM 25 stores, for example, OS settings and network settings.

The CPU 26 is a processor that loads programs and data from the ROM 25 or the secondary storage 28 onto the RAM 24 and executes the programs to perform processes.

The communication I/F 27 is an interface for connecting the information processing apparatus 20 to a network. The secondary storage 28 is a non-volatile storage device such as an HDD or an SSD for storing programs and data. The secondary storage 28 stores, for example, an OS and application programs that implement various functions on the OS.

<Hierarchical Structure of Software of Image Processing Apparatus 10>

Figure 4:
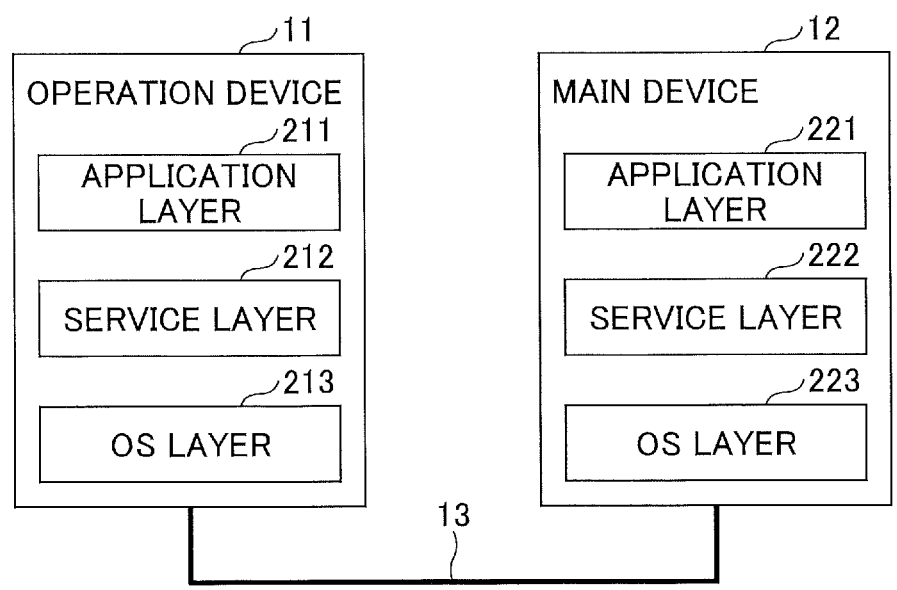
FIG. 4 is a drawing illustrating examples of hierarchical structures of software included in an operation device and a main device of an image processing apparatus according to an embodiment.

FIG. 4 is a drawing illustrating examples of hierarchical structures of software included in the operation device 11 and the main device 12 of the image processing apparatus 10 according to the present embodiment.

FIG. 4 illustrates the hierarchical structure of software included in the operation device 11 and the hierarchical structure of software included in the main device 12.

First, the hierarchical structure of software included in the main device 12 (i.e., programs stored in the ROM 122 and the HDD 124 of the main device 12) is described. The software included in the main device 12 may be roughly divided into an application layer 221, a service layer 222, and an OS layer 223.

The software in the application layer 221 operates hardware resources to implement image processing functions. Examples of software included in the application layer 221 include a print application, a scan application, a copy application, and a fax application.

The software in the service layer 222 intervenes between the application layer 221 and the OS layer 223. The software in the service layer 222 functions as an interface that enables the software in the application layer 221 to use hardware resources of the main device 12 and reports the states of the hardware resources of the main device 12 to the software in the application layer 221.

Specifically, the software in the service layer 222 receives execution requests for the hardware resources and coordinates the received execution requests. The execution requests received by the service layer 222 include, for example, image processing execution requests to the image processing engine 125 (e.g., a scan execution request to a scanner and a print execution request to a plotter).

The software in the service layer 222 also functions as an interface for an application layer 211 of the operation device 11. That is, the software in the application layer 211 of the operation device 11 can also operate the hardware resources of the main device 12 to implement the image processing functions by accessing the service layer 222.

The software in the OS layer 223 is a program referred to as basic software (operating system: OS) and provides basic functions for controlling the hardware resources of the main device 12. The software in the OS layer 223 receives execution requests for the hardware resources from the software in the application layer 221 via the software in the service layer 222, and executes processes corresponding to the received execution requests.

Next, the hierarchical structure of software included in the operation device 11 (i.e., programs stored in the ROM 112 and the flash memory 114 of operation device 11) is described. Similarly to the main device 12, the software included in the operation device 11 may be roughly divided into an application layer 211, a service layer 212, and an OS layer 213.

However, the functions provided by software in the application layer 211 and the types of execution requests receivable by the service layer 212 are different from those in the main device 12. The software in the application layer 211 of the operation device 11 mainly provides user interface functions for performing various operations and displaying information.

In the present embodiment, it is assumed that operating systems (OS) run independently in the operation device 11 and the main device 12. Also, as long as the operation device 11 and the main device 12 can communicate with each other, the operating systems may not necessarily be the same type. For example, the operation device 11 may use Android (registered trademark) as the OS, while the main device 12 may use Linux (registered trademark) as the OS.

Thus, in the image processing apparatus 10 of the present embodiment, the operation device 11 and the main device 12 are controlled by different operating systems. Therefore, communications between the operation device 11 and the main device 12 are not performed as interprocess communications within a single apparatus but are performed as communications between different information processing apparatuses.

However, the image processing apparatus 10 of the present embodiment is not limited to the above example where different types of operating systems are running on the operation device 11 and the main device 12, and the same type of operating systems may run on the operation device 11 and the main device 12. Also, the image processing apparatus 10 of the present embodiment is not limited to the above example where the operating systems run independently on the operation device 11 and the main device 12, and the operation device 11 and the main device 12 may be controlled by one operating system.

<Functional Configurations>

Figure 5:
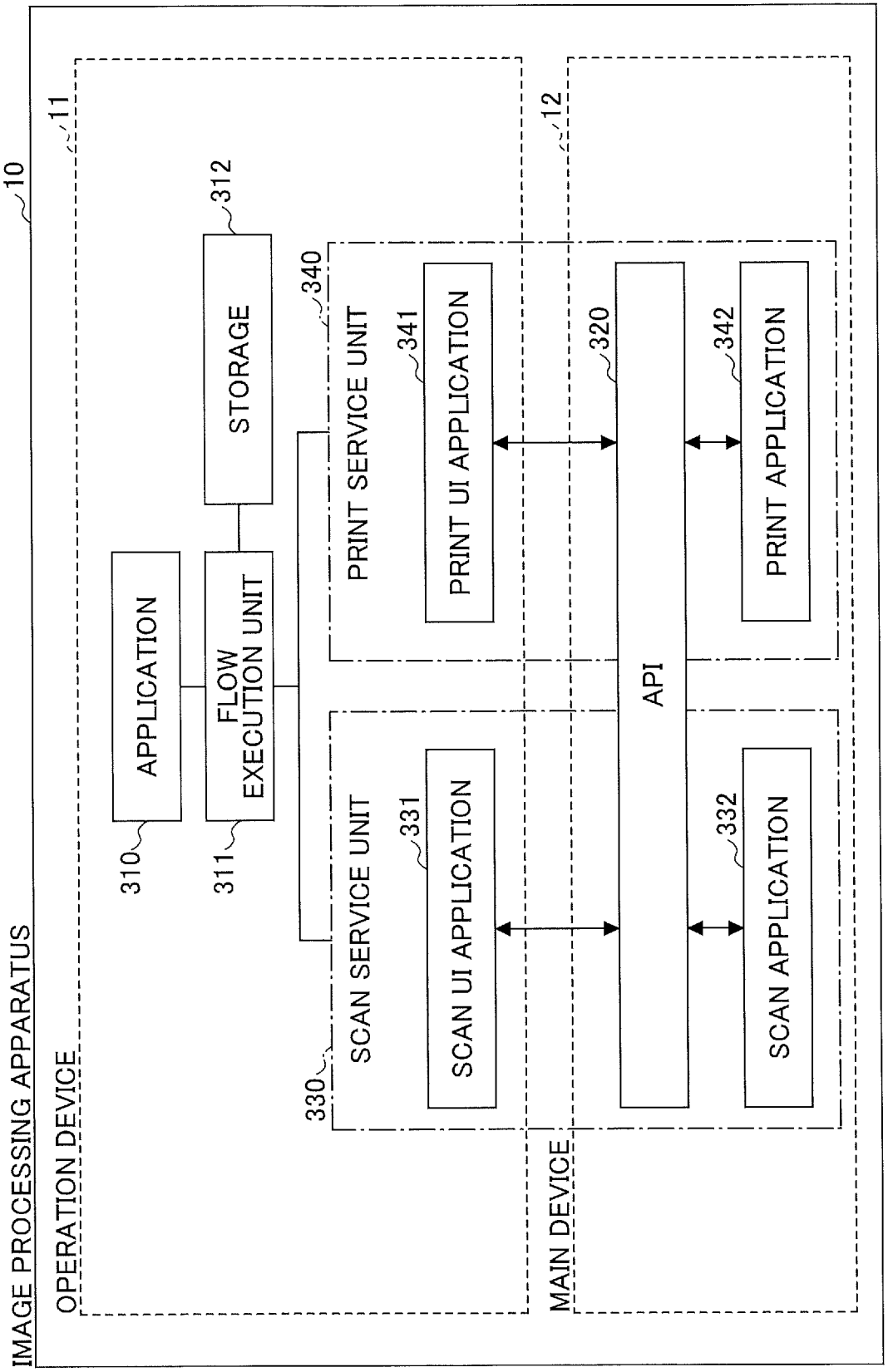
FIG. 5 is a block diagram illustrating a functional configuration of an image processing apparatus according to an embodiment.

FIG. 5 is a block diagram illustrating a functional configuration of the image processing apparatus 10 according to the present embodiment. The operation device 11 of the image processing apparatus 10 includes an application 310, a flow execution unit 311, a storage 312, a scan user interface (UI) application 331, and a print user interface (UI) application 341. The application 310, the flow execution unit 311, the scan UI application 331, and the print UI application 341 are executed by the CPU 111. The main device 12 of the image processing apparatus 10 includes an application programming interface (API) 320, a scan application 332, and a print application 342. The API 320, the scan application 332, and the print application 342 are executed by the CPU 121. The scan UI application 331, the API 320, and the scan application 332 may be collectively referred to as a "scan service unit 330". Also, the print UI application 341, the API 320, and the print application 342 may be collectively referred to as a "print service unit 340".

The image processing apparatus 10 may include one or more functions that are not limited to the scan function and the print function illustrated in FIG. 5. For example, the operation device 11 may also include a copy UI application, a fax UI application, and an optical character recognition (OCR) UI application. For example, the main device 12 may also include a copy application, a fax application, and an OCR application. That is, the image processing apparatus 10 may include various image processing service units such as a copy service unit, a fax service unit, and an OCR service unit.

The application 310 is an example of an application (which may also be referred to as an application program or application software) that is developed by, for example, a third-party vendor and installed in the image processing apparatus 10. As described above, the application 310 can provide a flow. Here, "flow" indicates a series of processes executed sequentially by multiple functions. In the present embodiment, a flow (i.e., a series of processes executed sequentially by multiple functions) can be handled as one job.

The development of the application 310 is described. The application 310 is developed (or configured) such that when the application 310 is started, information for identifying multiple functions included in the flow provided by the application 310 and the execution order of the multiple functions (i.e., the order in which the functions are executed) are registered in the flow execution unit 311.

In response to a flow registration request from the application 310, the flow execution unit 311 stores the information for identifying the multiple functions included in the flow provided by the application 310 and the execution order of the multiple functions (i.e., the order in which the functions are executed) in the storage 312. Also, in response to a flow execution request from the application 310, the flow execution unit 311 executes the functions identified based on the information stored in the storage 312 according to the execution order stored in the storage 312.

The storage 312 stores the information for identifying multiple functions included in the flow provided by the application 310 and the execution order of the multiple functions (i.e., the order in which the functions are executed). The information for identifying the multiple functions included in the flow provided by the application 310 and the execution order of the multiple functions may instead be stored in an apparatus (for example, a server) other than the image processing apparatus 10.

The scan UI application 331 is an application program that provides a user interface (UI) for scanning. The scan UI application 331 displays, for example, a scan setting screen and a screen indicating that the scanning is in progress. Also, in response to a request from the flow execution unit 311, the scan UI application 331 requests the scan application 332 to perform scanning via the API 320.

The print UI application 341 is an application program that provides a user interface (UI) for printing. The print UI application 341 displays, for example, a print setting screen and a screen indicating that the printing is in progress. Also, in response to a request from the flow execution unit 311, the print UI application 341 requests the print application 342 to perform printing via the API 320.

The API 320 is an application programming interface (API) used by the scan UI application 331 to request execution of scanning. The API 320 is also an API used by the print UI application 341 to request the execution of printing.

In response to a request from the scan UI application 331, the scan application 332 controls the image processing engine 125 to perform scanning.

In response to a request from the print UI application 341, the print application 342 controls the image processing engine 125 to perform printing.

In the embodiment described above, the flow execution unit 311 calls the scan UI application 331 (i.e., an application that calls the scan application 332) and the print UI application 341 (i.e., an application that calls the print application 342). Alternatively, the flow execution unit 311 may be configured to directly call the scan application 332 (i.e., an application that controls the image processing engine 125 to perform scanning) and the print application 342 (i.e., an application that controls the image processing engine 125 to perform printing).

As described below with reference to FIG. 6, the application 310 may include the flow execution unit 311 as information (inner-application information) inside of the application 310. The inner-application information may be a file including libraries located in a folder of the application 310. The libraries include a print function and a scan function, and the print function and the scan function in the libraries are usable as the application 310 according to definition information included in the application 310. The flow execution unit 311 may also be provided as an application different from the application 310.

Figure 6:
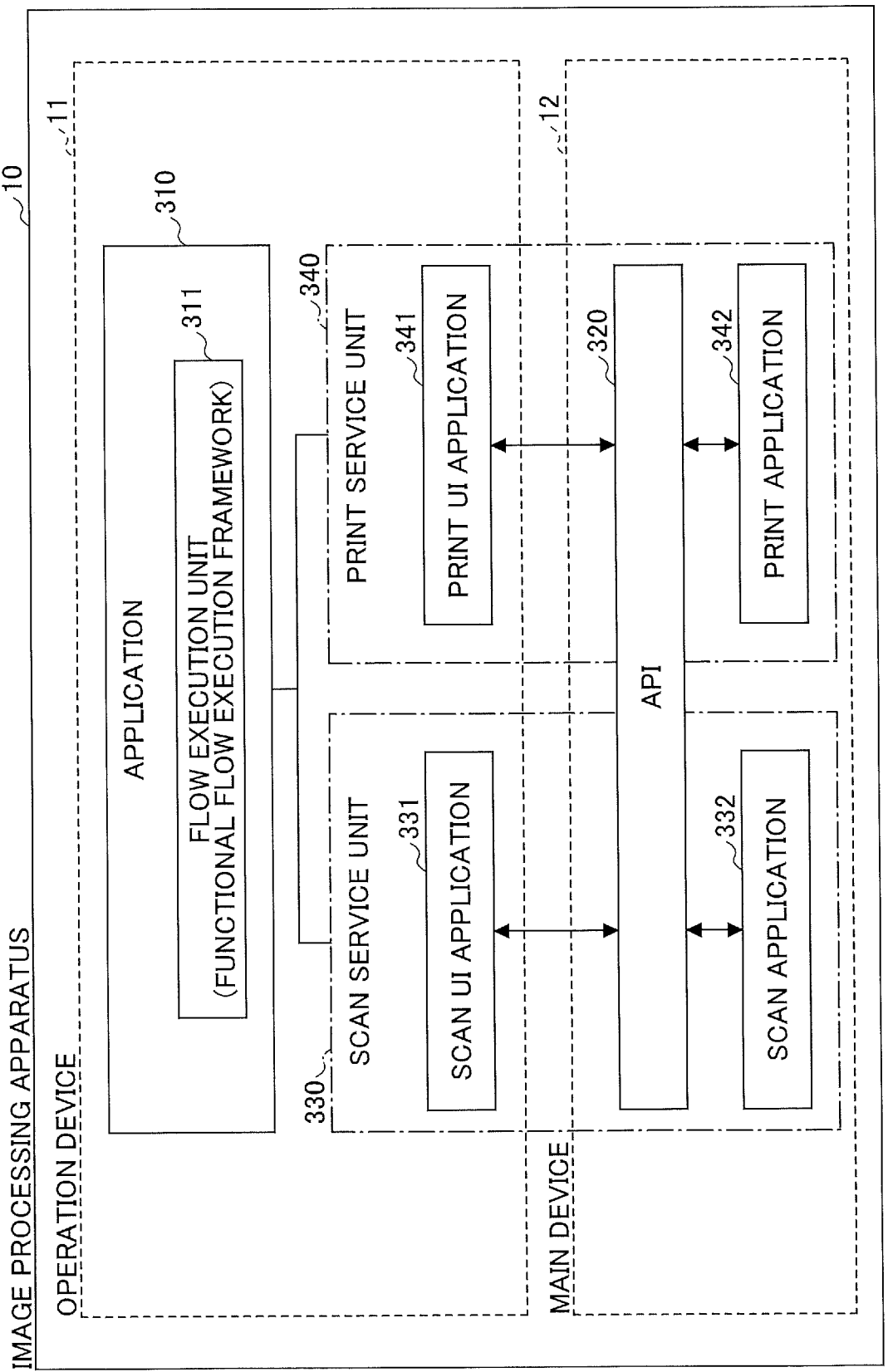
FIG. 6 is a block diagram illustrating a functional configuration of an image processing apparatus according to an embodiment.

FIG. 6 is a block diagram illustrating a functional configuration of the image processing apparatus 10 according to an embodiment. In the embodiment illustrated in FIG. 6, the application 310 includes the flow execution unit 311. Specifically, the developer of the application 310 incorporates a framework for executing the flow (which is hereafter referred to as a "functional flow execution framework") into the application 310 during the development. The framework functions as the flow execution unit 311. For example, the functional flow execution framework 311 is provided in the form of a jar file including software libraries. For example, the developer of the application 310 downloads the file of the functional flow execution framework 311 from a website of the manufacturer of the image processing apparatus 10 or a service provider, or obtains the file of the functional flow execution framework 311 from a recoding medium such as a disk. Also, when developing the application 310, the developer of the application 310 incorporates the functional flow execution framework 311 into the application 310 by placing the file of the functional flow execution framework 311 in a folder inside of the application 310. Also, the developer includes, in the application 310, definitions (a job definition unit 3104 described later) indicating functions and UIs in the functional flow execution framework 311 to be used and the order in which the functions and UIs in the functional flow execution framework 311 as well as a function (e.g., a stamp function described later) added to the application 310 are executed and displayed.

The scan UI application 331, the print UI application 341, the API 320, the scan application 332, and the print application 342 in FIG. 6 are the same as those in FIG. 5, and therefore their descriptions are omitted here.

Figure 7:
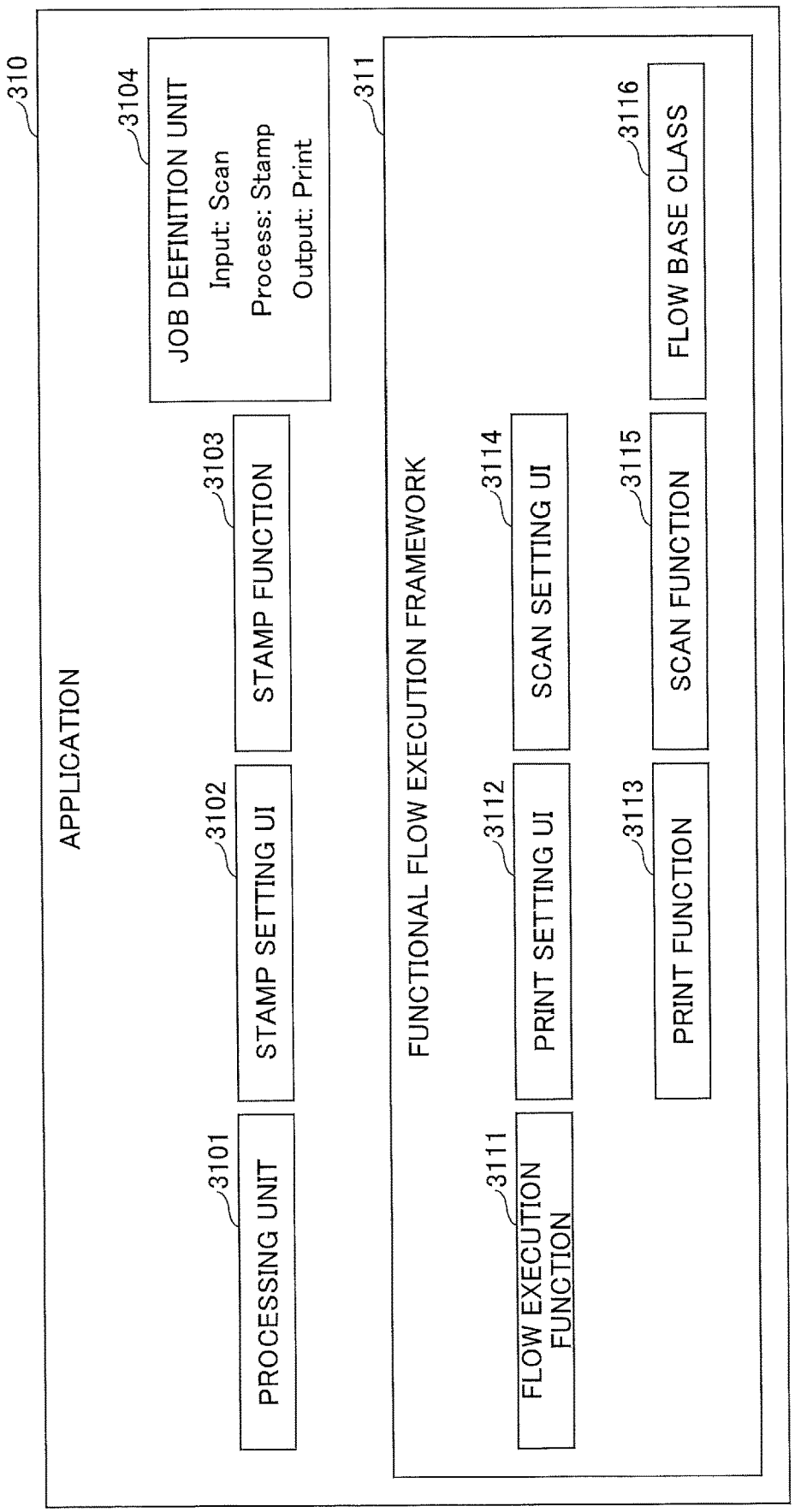
FIG. 7 is a block diagram illustrating functional configurations of an application and a functional flow execution framework according to an embodiment.

FIG. 7 is a block diagram illustrating functional configurations of the application 310 and the functional flow execution framework 311 according to an embodiment. The application 310 includes a processing unit 3101, a stamp setting UI 3102, a stamp function 3103, and a job definition unit 3104. The functional flow execution framework 311 incorporated in the application 310 includes a flow execution function 3111, a print setting UI 3112, a print function 3113, a scan setting UI 3114, a scan function 3115, and a flow base class 3116. The functional flow execution framework 311 provides the functions and the UIs as software libraries included in the functional flow execution framework 311 to the application 310. When the file of the functional flow execution framework 311 is placed in the folder inside of the application 310 as described above, the functions and the UIs included in the functional flow execution framework 311 become usable according to the definition of the application 310. Therefore, the developer of the application 310 do not have to develop the functions and the UIs included in the functional flow execution framework 311.

The job definition unit 3104 stores information for identifying multiple functions included in the flow and an execution order (which is also referred to as a "job definition") of the multiple functions. Specifically, the developer of the application 310 defines the job definition in the job definition unit 3104 during the development. In the example illustrated in FIG. 7, the job definition unit 3104 stores a job definition of a flow where an image is input by the scan function (Input: Scan), a stamp is added to the image (Process: Stamp), and the image with the stamp is output by the print function (Output: Print).

The processing unit 3101 calls and causes the flow execution function 3111 to execute the flow. Specifically, when the user starts the application 310, the processing unit 3101 registers a job definition (i.e., information for identifying multiple functions included in the flow and the execution order of the multiple functions) in the flow execution function 3111 based on the job definition defined during the development of the application 310. Also, the processing unit 3101 requests the flow execution function 3111 to start the execution of the flow when the user inputs an execution instruction to start the execution of the flow (for example, by pressing a start button).

In the embodiment illustrated in FIG. 7, a function (the stamp function in this example) other than the functions of the image processing apparatus is included in the flow. The developer of the application 310 provides the stamp setting UI 3102 and the stamp function 3103 in the application 310 during the development. Specifically, it is possible to indicate that the stamp function 3103 is a function for the flow by inheriting the flow base class 3116.

The stamp setting UI 3102 displays a stamp setting screen. The user inputs settings on the stamp setting screen. The stamp setting UI 3102 reports the settings input by the user to the flow execution function 3111.

The stamp function 3103 executes a stamp process using the settings input on the stamp setting screen of the stamp setting UI 3102. Also, the stamp function 3103 reports to the flow execution function 3111 that the execution of the stamp process has been completed. Specifically, the stamp function 3103 reports to the flow execution function 3111 that the execution of the stamp process by the stamp function 3103 has been completed.

The flow execution function 3111 executes the flow according to the job definition. Specifically, the flow execution function 3111 requests setting UIs (in the example of FIG. 7, the print setting UI 3112, the stamp setting UI 3102, and the scan setting UI 3114) to display setting screens (in the example of FIG. 7, a print setting screen, a stamp setting screen, and a scan setting screen). Also, the flow execution function 3111 requests the functions (in the example of FIG. 7, the scan function 3115, the stamp function 3103, and the print function 3113) to execute processes using the settings input on the setting screens of the setting UIs.

The print setting UI 3112 displays the print setting screen. The user inputs settings on the print setting screen. The print setting UI 3112 reports the settings input by the user to the flow execution function 3111.

The print function 3113 performs printing based on the print settings input on the print setting screen of the print setting UI 3112. Also, the print function 3113 reports to the flow execution function 3111 that the printing has been completed. Specifically, the print function 3113 reports to the flow execution function 3111 that the printing performed by the print application 342 has been completed.

The scan setting UI 3114 displays the scan setting screen. The user inputs settings on the scan setting screen. The scan setting UI 3114 reports the settings input by the user to the flow execution function 3111.

The scan function 3115 performs scanning based on the scan settings input on the scan setting screen of the scan setting UI 3114. Also, the scan function 3115 reports to the flow execution function 3111 that the scanning has been completed. Specifically, the scan function 3115 reports to the flow execution function 3111 that the scanning by the scan application 332 has been completed.

Figure 8:
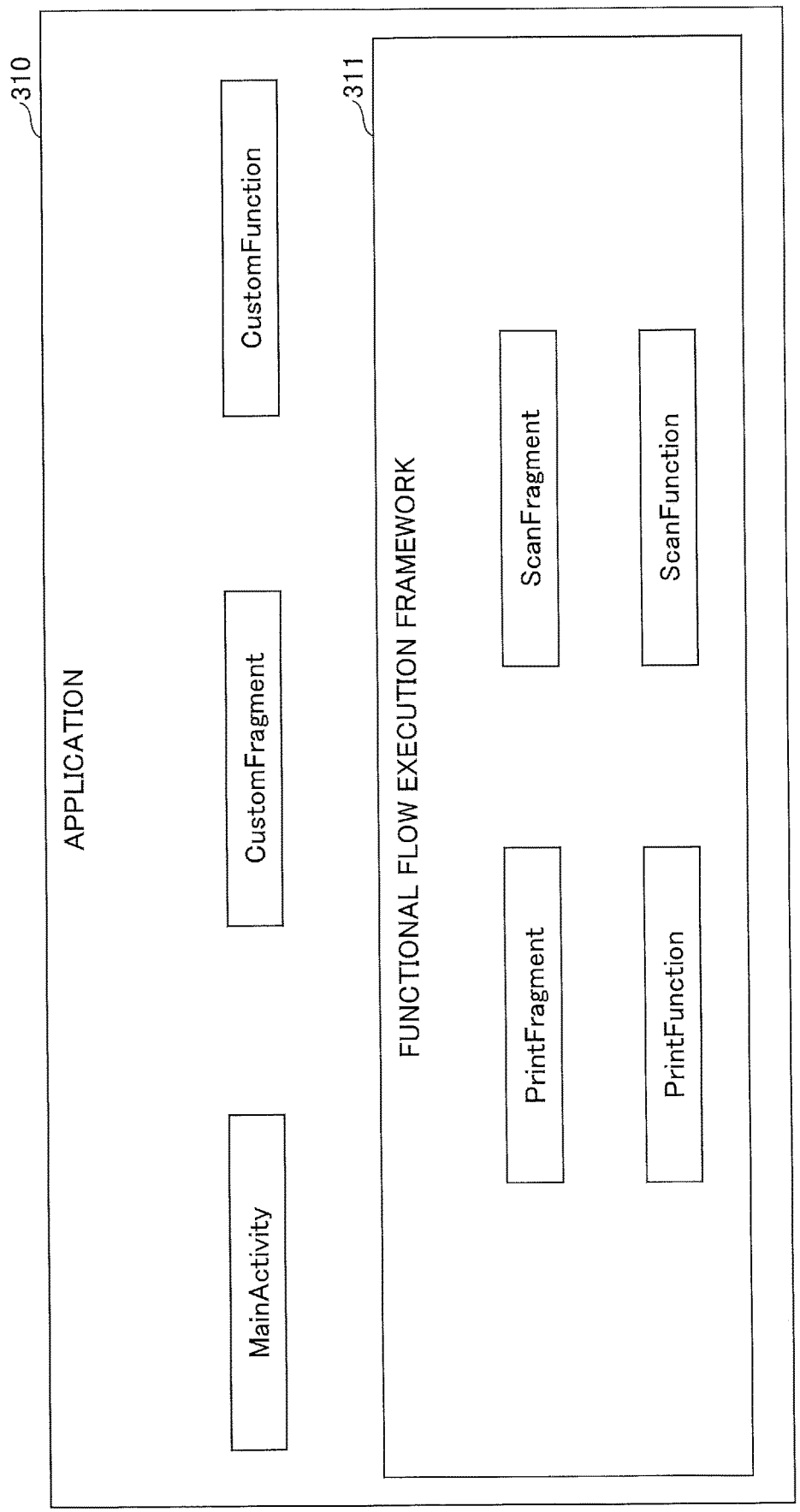
FIG. 8 is a drawing illustrating a module configuration of an application and a functional flow execution framework according to an embodiment.

FIG. 8 is a drawing illustrating a module configuration of the application 310 and the functional flow execution framework 311 according to an embodiment. Specifically, FIG. 8 illustrates a module configuration when the application 310 executes processes using the functional flow execution framework 311. As illustrated in FIG. 8, the application 310 includes a class "MainActivity" (the name is just an example) for displaying a screen. The functional flow execution framework 311 includes a class "PrintFunction" for using the print function and a class "ScanFunction" for using the scan function. Also, the functional flow execution framework 311 includes "PrintFragment" that is a screen for printing and "ScanFragment" that is a screen for scanning. The application 310 may include "CustomFragment". When the screens in the framework are not used, the screen "CustomFragment" is used instead of "PrintFragment" and "ScanFragment".

Each of the functional components described in the above embodiment may be implemented by one or more processing circuits. In the present application, the term "processing circuit" may indicate a processor that is implemented by an electronic circuit and programmed by software to implement various functions, or a device such as an application specific integrated circuit (ASIC), a digital signal processor (DSP), a field programmable gate array (FPGA), or a circuit module designed to implement the functions described above.

<Sequences>

Figure 9:
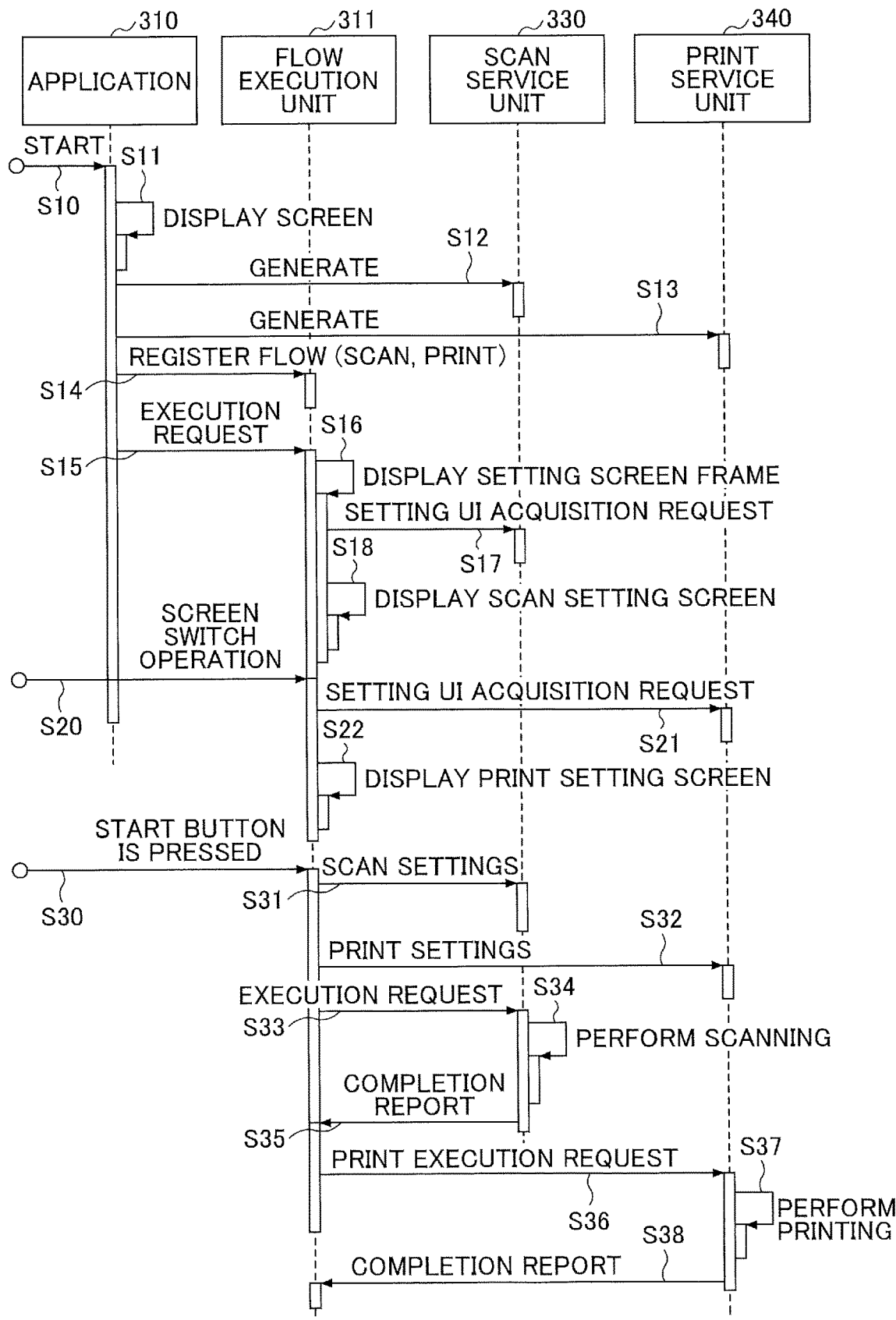
FIG. 9 is a sequence chart illustrating a process of executing multiple functions of an image processing apparatus according to an embodiment.

FIG. 9 is a sequence chart illustrating a process of executing multiple functions of the image processing apparatus 10 according to an embodiment. Here, an example of a flow where the print function is executed after the execution of the scan function is described.

At step S10, the application 310 installed in the image processing apparatus 10 is started.

At step S11, the application 310 displays a screen of the application 310 on the operations panel 115 of the image processing apparatus 10.

At step S12 and step S13, the application 310 generates objects of the functions included in the flow provided by the application 310.

At step S12, the application 310 generates an object of the scan function (instantiates the class) provided by the scan service unit 330 (e.g., the scan UI application 331 of the scan service unit 330). Alternatively, the object may be generated by the flow execution unit 311.

At step S13, the application 310 generates an object of the print function (instantiates the class) provided by the print service unit 340 (e.g., the print UI application 341 of the print service unit 340). Alternatively, the object may be generated by the flow execution unit 311.

At step S14, the application 310 requests the flow execution unit 311 to register information for identifying the multiple functions included in the flow provided by the application 310 and an execution order of the multiple functions (i.e., the order in which the functions are executed). In response to the flow registration request from the application 310, the flow execution unit 311 stores the information for identifying the multiple functions included in the flow provided by the application 310 and the execution order of the multiple functions (i.e., the order in which the functions are executed) in the storage 312.

That is, in response to the instruction by the user to start the application 310, the flow execution unit 311 receives the flow registration request from the application 310 and stores the information for identifying the multiple functions included in the flow for which the registration request is received and the execution order of the multiple functions.

At step S15, the application 310 requests the flow execution unit 311 to execute the flow.

At step S16, the flow execution unit 311 displays a frame of setting screens on the operations panel 115 of the image processing apparatus 10.

Here, screens are described. For example, a screen displayed on the image processing apparatus 10 may include a component (frame) that is common to setting screens of all functions included in the flow. The frame may include buttons (e.g., a start button, a cancel button, and a sleep button) for inputting instructions for controlling the execution of the flow. The frame may be displayed by a common function such as the flow execution function 3111 of the functional flow execution framework 311 (software library file) incorporated into the application 310. This reduces the workload of the developer of the application 310 for developing job execution functions and common functions such as the start button.

At step S17, the flow execution unit 311 requests the scan service unit 330 (e.g., the scan UI application 331 of the scan service unit 330) to obtain a setting UI (scan setting screen). For example, the flow execution unit 311 obtains the setting screen of a function that is to be executed first among the functions included in the flow.

At step S18, the flow execution unit 311 displays the scan setting screen obtained at step S17 in the frame displayed at step S16. The user inputs scan settings on the scan setting screen.

Here, it is assumed that a setting screen switching operation is performed at step S20.

At step S21, the flow execution unit 311 requests the print service unit 340 (e.g., the print UI application 341 of the print service unit 340) to obtain a setting UI (print setting screen).

At step S22, the flow execution unit 311 displays the print setting screen obtained at step S21 in the frame displayed at step S16. The user inputs print settings on the print setting screen.

At step S30, it is assumed that an execution instruction for starting the execution of the flow is input (for example, the start button is pressed).

At step S31, the flow execution unit 311 reports the scan settings input at step S18 to the scan service unit 330 (for example, the scan UI application 331 of the scan service unit 330).

At step S32, the flow execution unit 311 reports the print settings input at step S22 to the print service unit 340 (for example, the print UI application 341 of the print service unit 340).

At step S33, the flow execution unit 311 requests the scan service unit 330 (e.g., the scan UI application 331 of the scan service unit 330) to perform scanning.

At step S34, the scan service unit 330 performs scanning based on the scan settings reported at step S31. Specifically, the scan UI application 331 requests the scan application 332 to perform scanning.

At step S35, the scan service unit 330 reports to the flow execution unit 311 that the scanning has been completed. Specifically, the scan UI application 331 reports to the flow execution unit 311 that the scanning by the scan application 332 has been completed.

At step S36, the flow execution unit 311 requests the print service unit 340 (e.g., the print UI application 341 of the print service unit 340) to perform printing.

At step S37, the print service unit 340 performs printing based on the print settings reported at step S32. Specifically, the print UI application 341 requests the print application 342 to perform printing.

At step S38, the print service unit 340 reports to the flow execution unit 311 that the printing has been completed. Specifically, the print UI application 341 reports to the flow execution unit 311 that the printing by the print application 342 has been completed.

Thus, in response to a request from the application 310 to execute a flow, the flow execution unit 311 can switchably display setting screens for respective functions included in the flow, and execute the functions identified based on stored information in the stored execution order by using setting information input on the setting screens for the respective functions.

Thus, in the present embodiment, the flow execution unit 311 executes multiple functions included in a flow provided by the application 310 in an execution order (i.e., the order in which the functions are executed) by referring to the storage 312 (that is, the flow execution unit 311 executes the next function when receiving a completion report of the previous function).

In the example of FIG. 9, it is assumed that the functions included in the flow are configurable functions. However, the functions included in a flow may be non-configurable functions. For example, when a flow includes configurable functions but the application 310 is configured to prevent the user from making settings on the functions, the application 310 generates non-configurable objects at steps S12 and S13 in FIG. 9, or registers information indicating that the functions are not configurable in the flow registration at step S14 in FIG. 9. In this case, even if the flow execution unit 311 requests setting screens at steps S17 and S21 in FIG. 9, the flow execution unit 311 cannot obtain the setting screens.

Other Embodiments

In an embodiment of present invention, the application 310 may provide a flow including a function other than the functions of the image processing apparatus 10 (for example, a function that adds a stamp to an image). In this case, the application 310 generates an object (instantiates a class) of the function other than the functions of the image processing apparatus 10 when the application 310 is started. This configuration enables the flow execution unit 311 to call a function other than the functions of the image processing apparatus 10, display a setting screen for the function, and execute the function.

Figure 10:
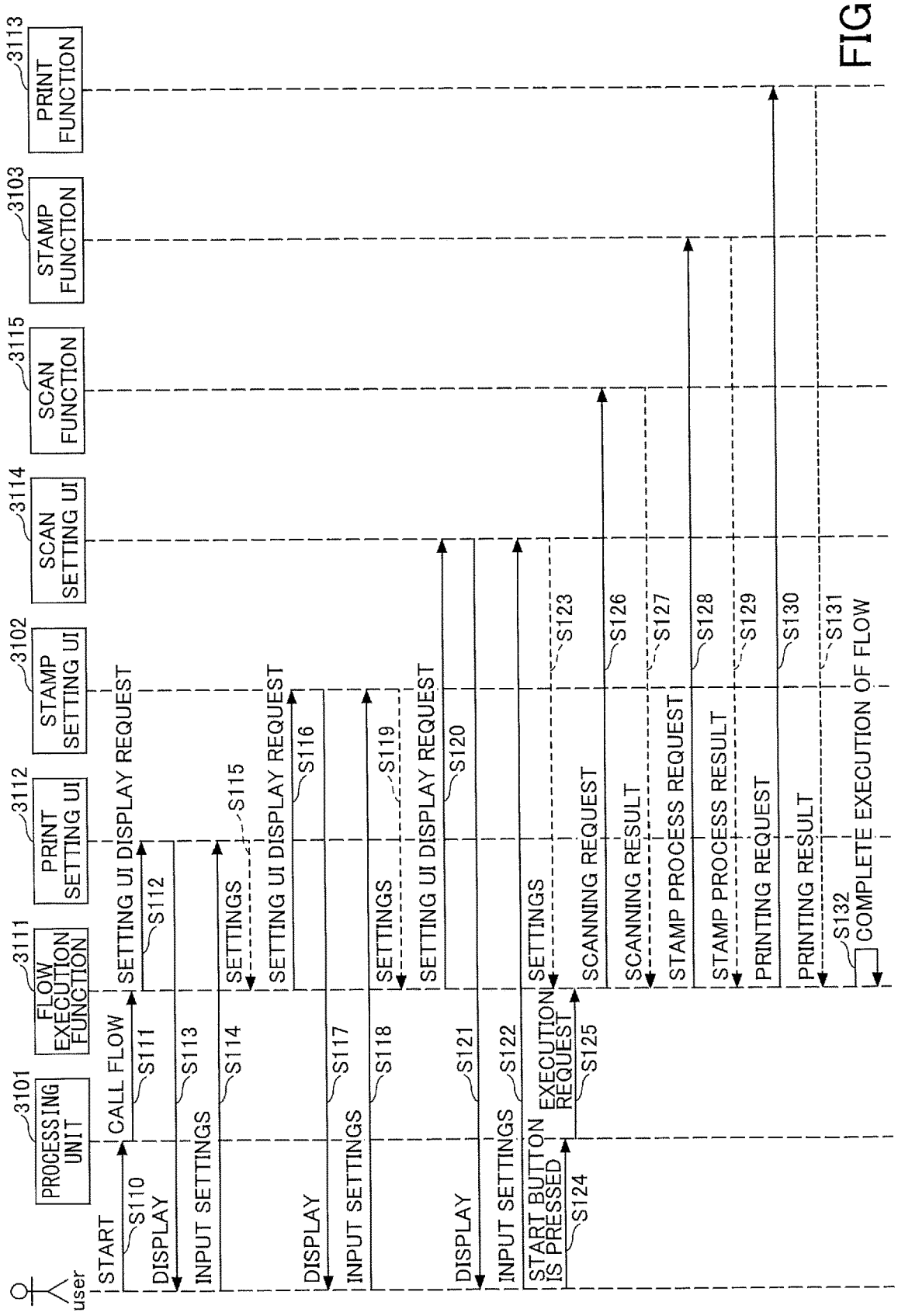
FIG. 10 is a sequence chart illustrating a process of executing multiple functions of an image processing apparatus according to an embodiment.

FIG. 10 is a sequence chart illustrating a process of executing multiple functions by the image processing apparatus 10 according to an embodiment. In this example, a flow includes a scan function, a stamp function, and a print function that are executed in this order.

At step S110, the application 310 installed in the image processing apparatus 10 is started.

At step S111, the processing unit 3101 of the application 310 calls the flow execution function 3111. Specifically, in response to the instruction from the user to start the application 310, the processing unit 3101 registers a job definition (i.e., information for identifying multiple functions included in the flow and the execution order of the multiple functions) in the flow execution function 3111 based on the job definition defined at the development of the application 310. Then, the flow execution function 3111 executes the flow according to the job definition as described below.

At step S112, the flow execution function 3111 requests the print setting UI 3112 to display a setting UI (print setting screen).

At step S113, the print setting UI 3112 displays the print setting screen.

At step S114, the user inputs print settings on the print setting screen.

At step S115, the print setting UI 3112 reports the print settings input at step S114 to the flow execution function 3111.

At step S116, the flow execution function 3111 requests the stamp setting UI 3102 to display a setting UI (stamp setting screen).

At step S117, the stamp setting UI 3102 displays the stamp setting screen.

At step S118, the user inputs stamp settings on the stamp setting screen.

At step S119, the stamp setting UI 3102 reports the stamp settings input at step S118 to the flow execution function 3111.

At step S120, the flow execution function 3111 requests the scan setting UI 3114 to display a setting UI (scan setting screen).

At step S121, the scan setting UI 3114 displays the scan setting screen.

At step S122, the user inputs scan settings on the scan setting screen.

At step S123, the scan setting UI 3114 reports the scan settings input at step S122 to the flow execution function 3111.

At step S124, it is assumed that an execution instruction to start the execution of the flow is input (for example, a start button is pressed).

At step S125, the processing unit 3101 requests the flow execution function 3111 to start the execution of the flow.

At step S126, the flow execution function 3111 requests the scan function 3115 to perform scanning based on the scan settings reported at step S123.

At step S127, the scan function 3115 reports to the flow execution function 3111 that the scanning has been completed. Specifically, the scan function 3115 reports to the flow execution function 3111 that the scanning by the scan application 332 has been completed.

At step S128, the flow execution function 3111 requests the stamp function 3103 to execute a stamp process based on the stamp settings reported at step S119.

At step S129, the stamp function 3103 reports to the flow execution function 3111 that the stamp process has been completed. Specifically, the stamp function 3103 reports to the flow execution function 3111 that the execution of the stamp process by the stamp function 3103 has been completed.

At step S130, the flow execution function 3111 requests the print function 3113 to perform printing based on the print settings reported at step S115.

At step S131, the print function 3113 reports to the flow execution function 3111 that the printing has been completed. Specifically, the print function 3113 reports to the flow execution function 3111 that the printing performed by the print application 342 has been completed.

At step S132, the flow execution function 3111 completes the execution of the flow (in the example of FIG. 10, the flow that executes the scan function, the stamp function, and the print function in this order).

<Flowcharts>

Figure 11:
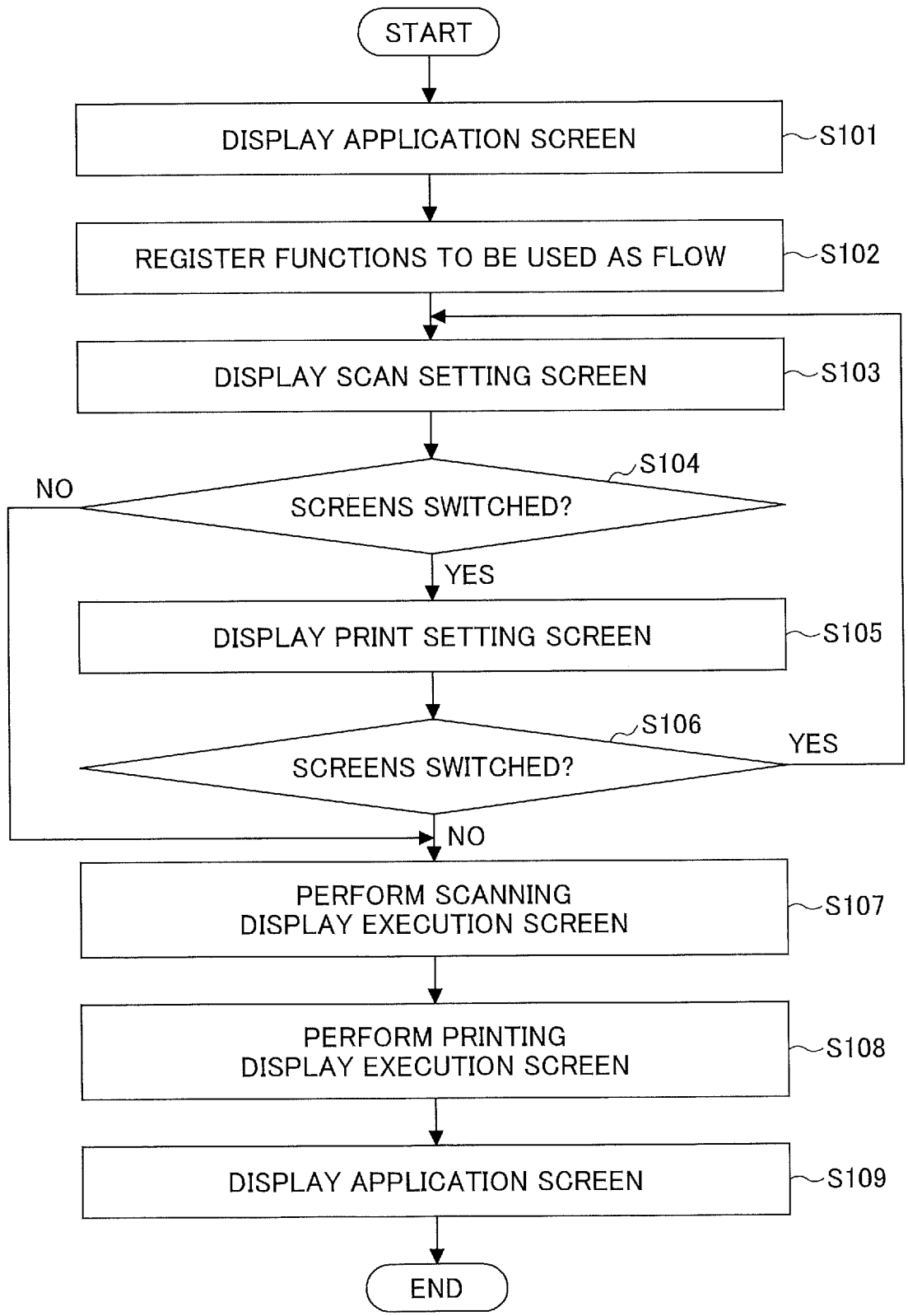
FIG. 11 is a flowchart illustrating a process of executing multiple functions in an image processing apparatus according to an embodiment.

Next, with reference to FIGS. 11 and 14, a process of executing multiple functions in the image processing apparatus according to an embodiment of the present invention and a process of executing multiple functions in a related-art image processing apparatus according to a comparative example are described.

FIG. 14 is a flowchart illustrating a process of executing multiple functions in a related-art image processing apparatus. In this example, a print function is executed after the execution of a scan function.

At step S201, an application installed in the image processing apparatus displays a screen of the application installed in the image processing apparatus.

At step S202, the application installed in the image processing apparatus calls an application that provides a function (a scan function in the example of FIG. 14) to be executed by the image processing apparatus.

At step S203, the application that provides the scan function of the image processing apparatus displays a scan setting screen.

At step S204, the application that provides the scan function of the image processing apparatus performs scanning and displays a screen indicating that the scanning is in progress.

At step S205, the application installed in the image processing apparatus displays the screen of the application installed in the image processing apparatus.

At step S206, the application installed in the image processing apparatus calls an application that provides the next function (a print function in the example of FIG. 14) to be executed by the image processing apparatus.

At step S207, the application that provides the print function of the image processing apparatus displays a print setting screen.

At step S208, the application that provides the print function of the image processing apparatus performs printing and displays a screen indicating that printing is in progress.

At step S209, the application installed in the image processing apparatus displays the screen of the application installed in the image processing apparatus.

Thus, in the related-art technology, the application installed in the image processing apparatus needs to sequentially call functions. For example, the application installed in the image processing apparatus needs to call a first function and then call a second function.

FIG. 11 is a flowchart illustrating a process of executing multiple functions in an image processing apparatus according to an embodiment. Here, an example of a flow where the print function is executed after the execution of the scan function is described.

At step S101, it is assumed that the application 310 installed in the image processing apparatus 10 is started. The application 310 displays a screen of the application 310. The application 310 requests the flow execution unit 311 to register information for identifying the multiple functions included in the flow provided by the application 310 and an execution order of the multiple functions (i.e., the order in which the functions are executed).

At step S102, the flow execution unit 311 of the image processing apparatus 10 registers the functions used by the application 310 as a flow. Specifically, in response to the flow registration request received at step S101, the flow execution unit 311 stores the information for identifying the multiple functions included in the flow provided by the application 310 and the execution order of the multiple functions (i.e., the order in which the functions are executed) in the storage 312.

At step S103, the flow execution unit 311 displays a scan setting screen.

At step S104, the flow execution unit 311 determines whether the setting screen has been switched. If the setting screen has been switched, the process proceeds to step 105. If the setting screen has not been switched and an execution instruction to start the execution of the flow is input, the process proceeds to step 107.

At step S105, the flow execution unit 311 displays a print setting screen.

At step S106, the flow execution unit 311 determines whether the setting screen has been switched. If the setting screen has been switched, the process returns to step 103. If the setting screen has not been switched and an execution instruction to start the execution of the flow is input, the process proceeds to step 107.

At step S107, the flow execution unit 311 requests the scan service unit 330 to perform scanning and displays a screen indicating that the scanning is in progress.

At step S108, the flow execution unit 311 requests the print service unit 340 to perform printing and displays a screen indicating that the printing is in progress.

At step S109, the application 310 installed in the image processing apparatus 10 displays the screen of the application 310.

Thus, in an embodiment of the present invention, the application 310 installed in the image processing apparatus 10 can store the information for identifying the multiple functions included in the flow provided by the application 310 and the execution order of the multiple functions in the storage 312 when the application 310 is started, and request the flow execution unit 311 to execute the multiple functions in the execution order.

<User Interfaces>

Figure 12:
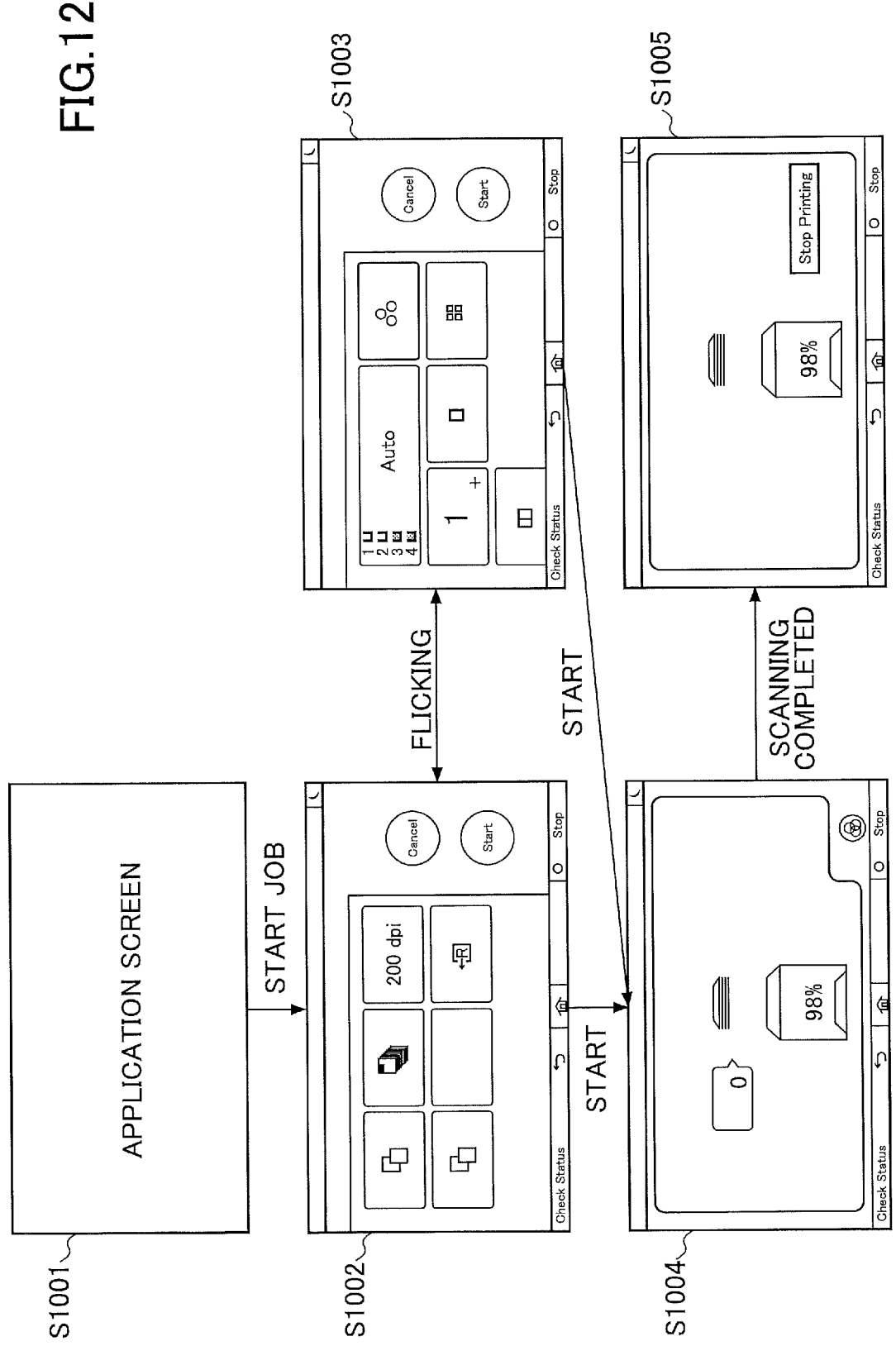
FIG. 12 is a drawing illustrating an example of transition of screens displayed on an image processing apparatus according to an embodiment.
Figure 13:
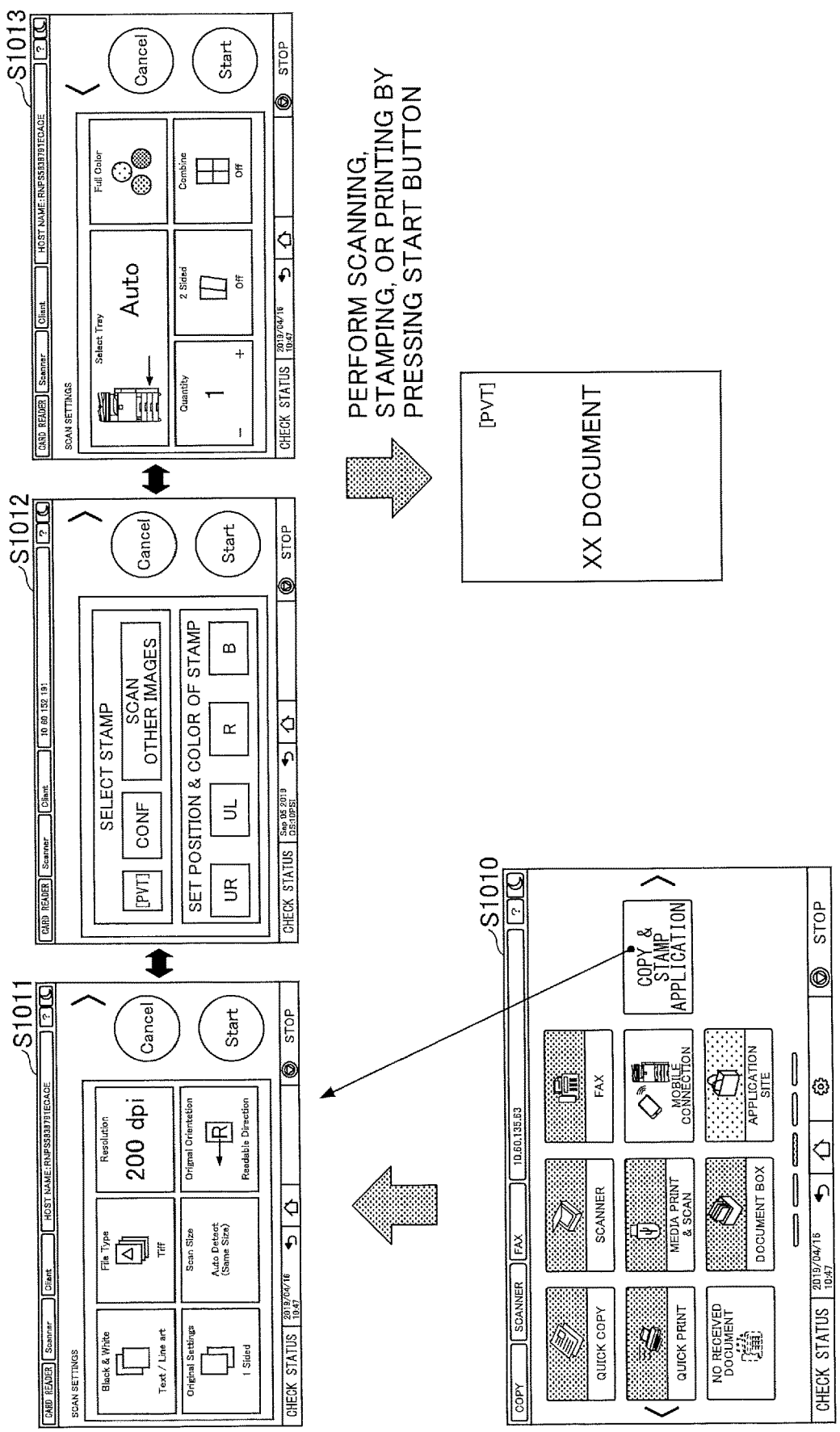
FIG. 13 is a drawing illustrating an example of transition of screens displayed on an image processing apparatus according to an embodiment.

Next, with reference to FIG. 12, FIG. 13, and FIG. 15, the transition of screens displayed on the image processing apparatus of the present embodiment and the transition of screens displayed on the related-art image processing apparatus are described in comparison with each other.

FIG. 15 is a drawing illustrating an example of transition of screens displayed on the related-art image processing apparatus. In this example, it is assumed that the print function is executed after the execution of the scan function.

At step S2001, a screen provided by an application installed in the image processing apparatus is displayed. When the user selects a function (the scan function in the example of FIG. 15) to be executed by the image processing apparatus, the screen transitions to another screen at step S2002.

At step S2002, a scan setting screen is displayed. When the user inputs settings and then inputs an execution instruction to start the execution of the scan function, the screen transitions to another screen at step S2003.

At step S2003, a screen indicating that the scanning is in progress is displayed. When the scanning is completed, the screen transitions to another screen at step S2004.

At step S2004, the screen provided by the application installed in the image processing apparatus is displayed. When the user selects a function (the print function in the example of FIG. 15) to be executed next by the image processing apparatus, the screen transitions to another screen at step S2005.

At step S2005, a print setting screen is displayed. When the user inputs settings and then inputs an execution instruction to start the execution of the print function, the screen transitions to another screen at step S2006.

At step S2006, a screen indicating that printing is in progress is displayed.

Thus, in the related-art technology, the user needs to input settings and an execution instruction for each function. That is, for example, the user needs to input settings for a first function, input an execution instruction for the first function, input settings for a second function, and then input an execution instruction for the second function.

FIG. 12 is a drawing illustrating an example of transition of screens displayed on an image processing apparatus according to an embodiment. Here, an example of a flow where the print function is executed after the execution of the scan function is described.

At step S1001, a screen provided by the application 310 installed in the image processing apparatus 10 is displayed. When the user selects a flow to be executed by the image processing apparatus 10 (in the example of FIG. 12, a flow where the print function is executed after the execution of the scan function), the screen transitions to another screen at step S1002.

At step S1002, a setting screen of a function included in the flow (in the example of FIG. 12, a scan setting screen) is displayed. When, for example, flicking (or a sliding operation) is performed at step S1002, the setting screen transitions to a setting screen of another function (a print setting screen in the example of FIG. 12) at step S1003.

At step S1003, the setting screen of another function (the print setting screen in the example of FIG. 12) is displayed. When, for example, flicking (or a sliding operation) is performed at step S1003, the setting screen transitions to the setting screen of step S1002, which is the setting screen of another function (in the example of FIG. 12, the scan setting screen).

Thus, in the present embodiment, the setting screens of functions can be switched by, for example, flicking (or a sliding operation). That is, even when the execution of a function has not been completed, a setting screen of another function can be displayed.

When the user inputs an execution instruction to start the execution of the flow at step S1002 or S1003, the setting screen transitions to another screen at step S1004.

At step S1004, a screen indicating that the scanning is in progress is displayed. When the scanning is completed, the screen transitions to another screen at step S1005.

At step S1005, a screen indicating that the printing is in progress is displayed.

FIG. 13 is a drawing illustrating an example of transition of screens displayed on an image processing apparatus according to an embodiment. In this example, it is assumed that a flow includes a scan function, a stamp function, and a print function that are executed in this order.

At step S1010, a home screen of the image processing apparatus 10 is displayed. When the user selects an application (e.g., the application 310 installed in the image processing apparatus 10) that provides a flow (in the example of FIG. 13, a flow that executes the scan function, the stamp function, and the print function in this order), the home screen transitions to another screen at step S1011.

At step S1011, a setting screen of a function included in the flow (in the example of FIG. 13, a scan setting screen) is displayed. At step S1011, when flicking (or a sliding operation) is performed, the scan setting screen transitions to a setting screen of another function (in the example of FIG. 13, a stamp setting screen) at step S1012.

At step S1012, the setting screen of another function (in the example of FIG. 13, the stamp setting screen for selecting, for example, the type of a stamp, the position on paper in which the stamp is placed, and the color of the stamp) is displayed. At step S1012, when flicking (or a sliding operation) is performed, the stamp setting screen transitions to a setting screen of another function (in the example of FIG. 13, a print setting screen) at step S1013 (or to the scan setting screen of step S1011).

At step S1013, the setting screen of another function (the print setting screen in the example of FIG. 13) is displayed. When, for example, flicking (or a sliding operation) is performed at step S1013, the print setting screen transitions to the setting screen of another function (in the example of FIG. 13, the stamp setting screen of step S1012).

Thus, in the present embodiment, the setting screens of functions can be switched by, for example, flicking (or a sliding operation). That is, even when the execution of a function has not been completed, a setting screen of another function can be displayed.

When the user inputs an execution instruction to start the execution of the flow at step S1011, S1012, or S1013, the scan function, the stamp function, and the print function are executed in this order.

Thus, with the configuration of the present embodiment, the user can input the settings of all the functions included in the flow at once and needs to input the execution instruction of the flow only once (that is, the execution of multiple functions can be treated as the execution of one job).

<Effects>

According to an embodiment of the present invention, the user who operates an application installed in the image processing apparatus can input settings of multiple functions included in a flow provided by the application at once, and can instruct the execution of multiple functions through a single operation. Also, the present embodiment enables a third-party vendor to develop an application that provides a flow (i.e., a series of processes for executing multiple functions sequentially) by simply specifying the multiple functions and the execution order of the functions.

An image processing apparatus, a method, and a storage medium according to embodiments of the present invention are described above. However, the present invention is not limited to the above-described embodiments, and variations and modifications may be made without departing from the scope of the present invention.

What is claimed is:

1. An image processing apparatus, comprising:
a processor; and
a memory storing program instructions that cause the processor to
receive, in response to an instruction from a user to start an application installed in the image processing apparatus, a request to register a flow from the application,
store information for identifying functions included in the flow and an execution order of the functions,
switchably display setting screens for the respective functions included in the flow in response to a request from the application to execute the flow, and
execute the functions identified based on the stored information in the stored execution order based on setting information input on the setting screens for the respective functions, wherein
the application includes flow execution information that provides the functions as libraries included in the flow execution information to the application, the libraries being placed in a folder of the application, and
the functions included in the libraries are usable as the application according to definition information included in the application.

2. The image processing apparatus as claimed in claim 1, wherein
the libraries include a print function and a scan function; and
the print function and the scan function included in the libraries are usable as the application according to definition information included in the application.

3. The image processing apparatus as claimed in claim 1, wherein the flow execution framework is implemented as an application different from the application that requests the execution of the flow.

4. The image processing apparatus as claimed in claim 1, wherein the request from the application to execute the flow includes a request for a setting screen for a first function that is to be executed first among the functions according to the stored execution order.

5. The image processing apparatus as claimed in claim 4, wherein
the image processing apparatus is configured such that the setting screen for the first function transitions to a setting screen for another function in the functions in response to an instruction to switch the setting screens from the user; and
the first function is a scan function and the another function is a print function.

6. The image processing apparatus as claimed in claim 1, wherein the program instructions further cause the processor to
display a frame that is common to the setting screens for the respective functions; and
in response to an execution instruction input on the frame to start execution of the flow, execute the functions identified based on the stored information in the stored execution order using the setting information input on the setting screens for the respective functions.

7. The image processing apparatus as claimed in claim 1, wherein the functions include one or more functions of the image processing apparatus and a function other than the functions of the image processing apparatus.

8. The image processing apparatus as claimed in claim 1, wherein at least one of the functions is a function of the image processing apparatus.

9. The image processing apparatus as claimed in claim 1, wherein at least one of the functions is a function other than functions of the image processing apparatus.

10. A method performed by an image processing apparatus, the method comprising:
   receiving, in response to an instruction from a user to start an application installed in the image processing apparatus, a request to register a flow from the application;
   storing information for identifying functions included in the flow and an execution order of the functions;
   switchably displaying setting screens for the respective functions included in the flow in response to a request from the application to execute the flow; and
   executing the functions identified based on the stored information in the stored execution order based on setting information input on the setting screens for the respective functions, wherein
      the application includes flow execution information that provides the functions as libraries included in the flow execution information to the application, the libraries being placed in a folder of the application, and
      the functions included in the libraries are usable as the application according to definition information included in the application.

11. A non-transitory computer-readable storage medium storing a program for causing an image processing apparatus to execute a process, the process comprising:
   receiving, in response to an instruction from a user to start an application installed in the image processing apparatus, a request to register a flow from the application;
   storing information for identifying functions included in the flow and an execution order of the functions;
   switchably displaying setting screens for the respective functions included in the flow in response to a request from the application to execute the flow; and
   executing the functions identified based on the stored information in the stored execution order based on setting information input on the setting screens for the respective functions, wherein
      the application includes flow execution information that provides the functions as libraries included in the flow execution information to the application, the libraries being placed in a folder of the application, and
      the functions included in the libraries are usable as the application according to definition information included in the application.

* * * * *